US010199074B2

(12) United States Patent
Decoodt et al.

(10) Patent No.: US 10,199,074 B2
(45) Date of Patent: Feb. 5, 2019

(54) TECHNIQUES FOR SELECTING FRAMES FOR DECODE IN MEDIA PLAYER

(71) Applicant: Apple Inc., Cupertino, CA (US)

(72) Inventors: Jerome Decoodt, San Francisco, CA (US); John Samuel Bushell, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/612,947

(22) Filed: Jun. 2, 2017

(65) Prior Publication Data

US 2018/0350407 A1 Dec. 6, 2018

(51) Int. Cl.
| | |
|---|---|
| *H04N 5/92* | (2006.01) |
| *G11B 27/34* | (2006.01) |
| *H04N 19/44* | (2014.01) |
| *H04N 21/845* | (2011.01) |
| *H04N 21/4402* | (2011.01) |
| *G11B 27/00* | (2006.01) |
| *H04N 5/917* | (2006.01) |
| *H04N 5/89* | (2006.01) |
| *H04N 5/783* | (2006.01) |

(52) U.S. Cl.
CPC ............ *G11B 27/34* (2013.01); *G11B 27/005* (2013.01); *H04N 19/44* (2014.11); *H04N 21/4402* (2013.01); *H04N 21/8455* (2013.01)

(58) Field of Classification Search
USPC ....... 386/326, 329, 336, 343, 344, 345, 346, 386/347, 348
See application file for complete search history.

(56) References Cited

U.S. PATENT DOCUMENTS

| | | | | |
|---|---|---|---|---|
| 6,297,852 | B1* | 10/2001 | Laksono | G09G 5/12 348/500 |
| 7,088,776 | B2* | 8/2006 | Haskell | G06T 9/005 375/240.23 |
| 8,018,502 | B2* | 9/2011 | Shimazaki | G11B 27/105 348/231.5 |
| 2016/0127614 | A1* | 5/2016 | Molnar | H04N 5/04 386/207 |
| 2016/0275916 | A1* | 9/2016 | Glen | G09G 5/395 |

* cited by examiner

*Primary Examiner* — Daquan Zhao
(74) *Attorney, Agent, or Firm* — Baker & Hostetler LLP

(57) ABSTRACT

Techniques are disclosed for selecting frames for decode and display during different playback modes of a media player. Prediction dependencies may be estimated among frames from a sample table of a media item identifying dependency state among frames in the media item. Based on a playback rate of a media player, a collection of frames may be identified from the media item that have presentation times within a display refresh time of the player. A frame may be selected for decode and display during the display refresh time based on the estimated prediction dependencies. The selected frame may be decoded for display during the player display refresh time.

32 Claims, 6 Drawing Sheets

100

200

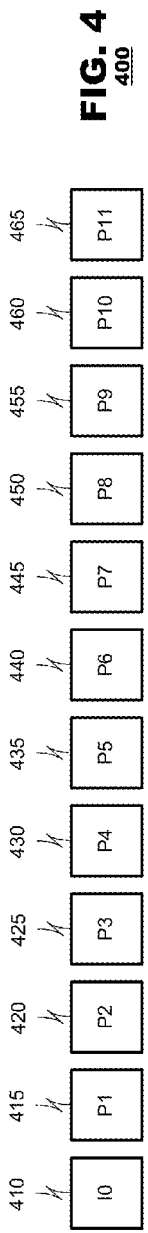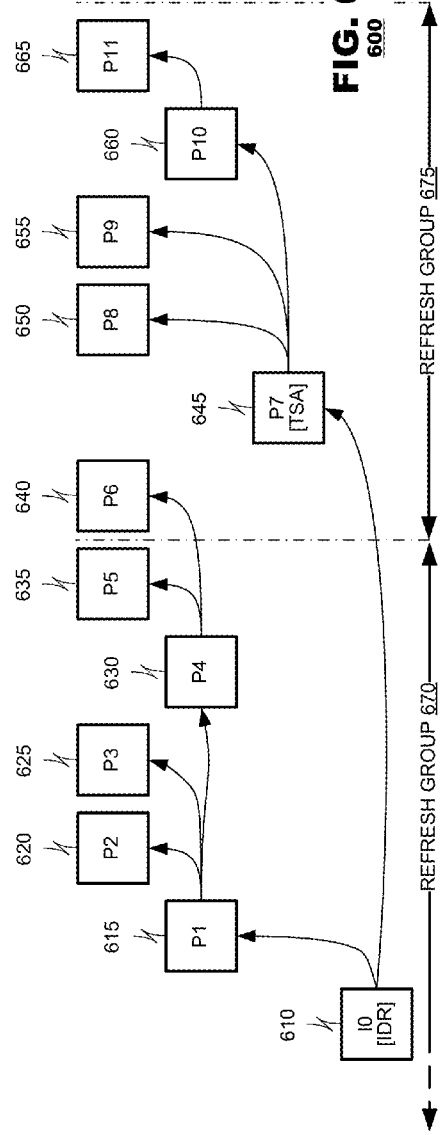

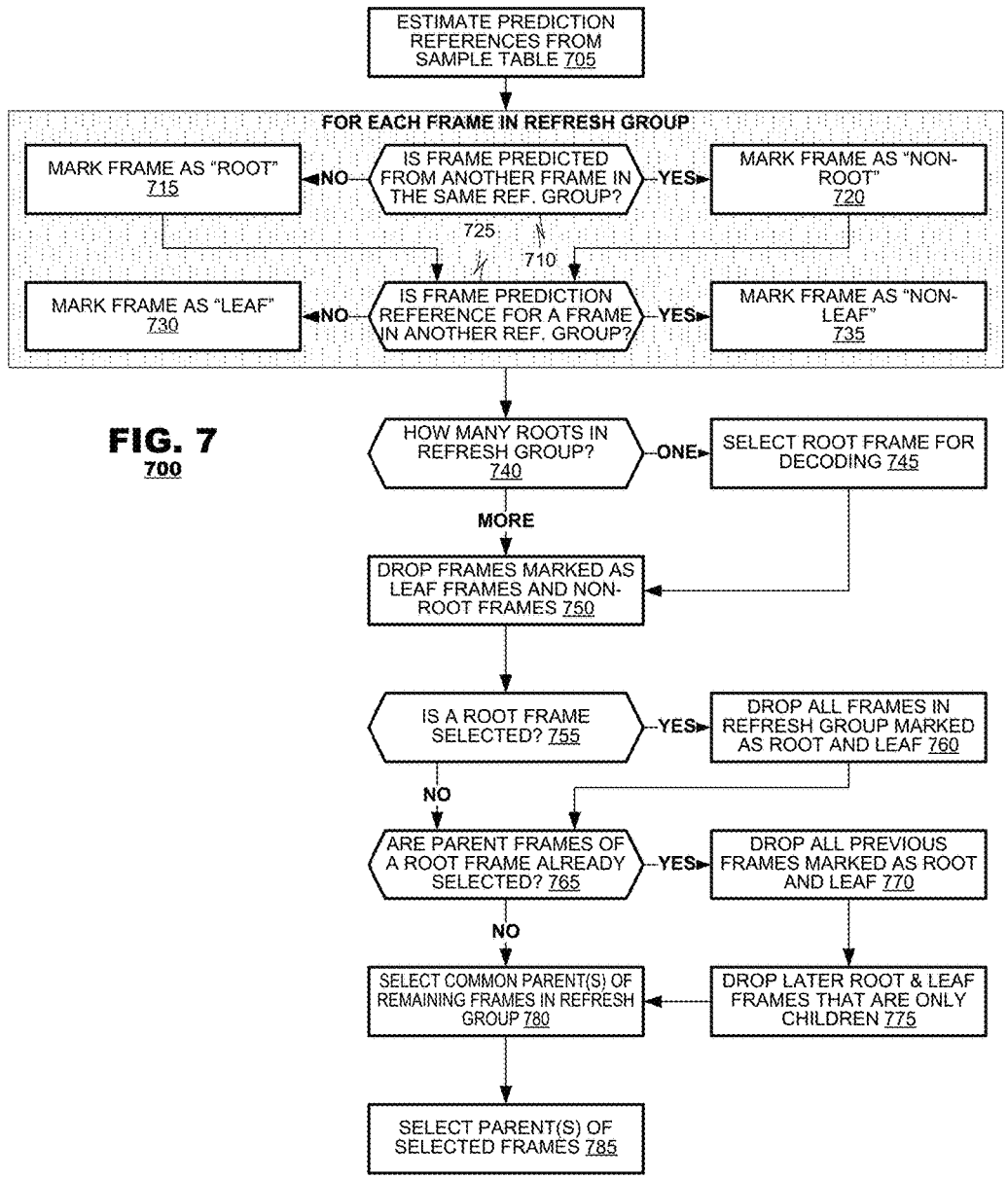

800

900

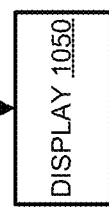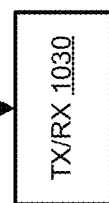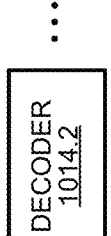
FIG. 10
1000

TECHNIQUES FOR SELECTING FRAMES FOR DECODE IN MEDIA PLAYER

BACKGROUND

The present disclosure relates to control techniques for media player devices and, in particular, to control techniques for selecting frames to be decoded by such player devices.

Media delivery applications are becoming widespread in modern consumer devices. Media items representing video programming may be delivered from a media source device to a player device over a computer network where they may be decoded and displayed. Video content of the media item typically is coded by a protocol that compresses bandwidth of the video signal to reduce resource consumption in the network(s) such as the Internet that carry the media item from the media source to the player device. Such coding protocols often exploit spatial and/or temporal redundancies in media content to achieve compression. As a consequence, individual frames may not be accessible independently of other frames; the coding protocol may establish prediction dependencies between frames, which require some frames to be decoded before other frames can be decoded. These prediction dependencies can interfere with playback modes that require access to arbitrarily-selected frames.

In many applications, there is reasonable network latency between the media source and the player device. It often is valuable to deliver media items that contain content for all foreseeable playback modes. Thus, a given media item may have a sufficient number of frames not only to support "normal" playback modes but also to support trickplay modes, such as slow-motion playback. It is not uncommon for media items, for example, to contain a number of frames far in excess of ordinary playback modes—for example, 240 frames per second ("fps") where normal playback might require only 60 fps—which would be accessed during alternative playback modes. Without some type of selection algorithm, a player device might require decode of all coded frames of a media item when only a smaller set is required for playback.

The inventors perceive a need in the art for a player control technique that selects coded frames from within a media item at reasonable processing cost.

BRIEF DESCRIPTION OF THE DRAWINGS

FIG. 4 illustrates an exemplary frame sequence on which embodiments of the present disclosure may operate.

FIG. 5 illustrates an exemplary sample table corresponding to the frame sequence of FIG. 4.

FIG. 6 illustrates prediction references that may be derived from the sample table of FIG. 5.

FIG. 7 illustrates a method for selecting frames for decode according to an embodiment of the present disclosure.

FIG. 10 illustrates an exemplary computer system that is suitable for use with the present disclosure.

DETAILED DESCRIPTION

Embodiments of the present disclosure provide techniques for selecting frames for decode and display during different playback modes of a media player. According to the techniques, prediction dependencies may be estimated among frames from a sample table of a media item identifying dependency state among frames in the media item. Based on a playback rate of a media player, a collection of frames may be identified from the media item that have presentation times within a display refresh time of the player. A frame may be selected for decode and display during the display refresh time based on the estimated prediction dependencies. The selected frame may be decoded for display during the player display refresh time.

Figure 1:
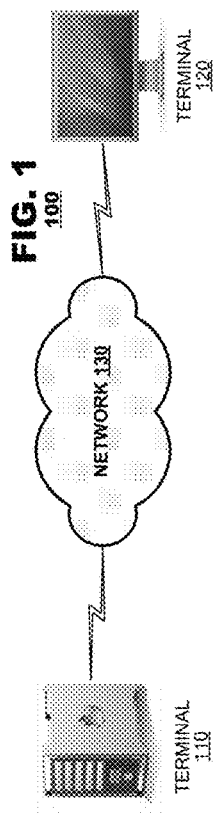
FIG. 1 is a simplified block diagram of a video delivery system according to an embodiment of the present disclosure.

FIG. 1 is a simplified block diagram of a video delivery system 100 according to an embodiment of the present disclosure. The system 100 may include a plurality of terminals 110, 120 interconnected via a network 130. A first terminal 110 may deliver media items representing desired video to a second terminal 120 for rendering. The second terminal 120 may receive the coded video data, decode it, and render it locally, for example, on a display at the terminal 120. Individual frames of the media item may be coded by a predetermined coding protocol which typically compresses bandwidth occupied by the media item as it is carried by the network 130.

A video coding system 100 may be used in a variety of applications. In a first application, a terminal 110 may code pre-produced video (for example, television or movie programming) and store the coded video for delivery to one or, often, many downloading clients (e.g., terminal 120). Thus, the video being coded may be live or pre-produced, and the terminal 110 may act as a media server, delivering the coded video according to a one-to-one or a one-to-many distribution model. In another application, the terminals 110, 120 may support real time bidirectional exchange of coded video to establish a video conferencing session between them. For the purposes of the present discussion, the type of video and the video distribution schemes are immaterial unless otherwise noted.

In FIG. 1, the terminals 110, 120 are illustrated as servers and flat panel displays, respectively, but the principles of the present disclosure are not so limited. Embodiments of the present disclosure also find application with computers (desktop, laptop and tablet computers), smart phones, computer servers, media players, dedicated video conferencing equipment and/or dedicated video encoding equipment.

The network 130 represents any number of networks that convey coded video data between the terminals 110, 120, including for example wireline and/or wireless communication network. The communication network 130 may exchange data in circuit-switched or packet-switched channels. Representative networks include telecommunications network, local area networks, wide area networks, and/or the Internet. For the purposes of the present discussion, the architecture and topology of the network 130 are immaterial to the operation of the present disclosure unless otherwise noted.

In other embodiments, a decoding terminal 120 may retrieve a media item from a storage device, such as an electrical-, magnetic- or optical-based stored medium. Such applications do not need a distribution terminal 110 or network to provide media items to a terminal 120.

Figure 2:
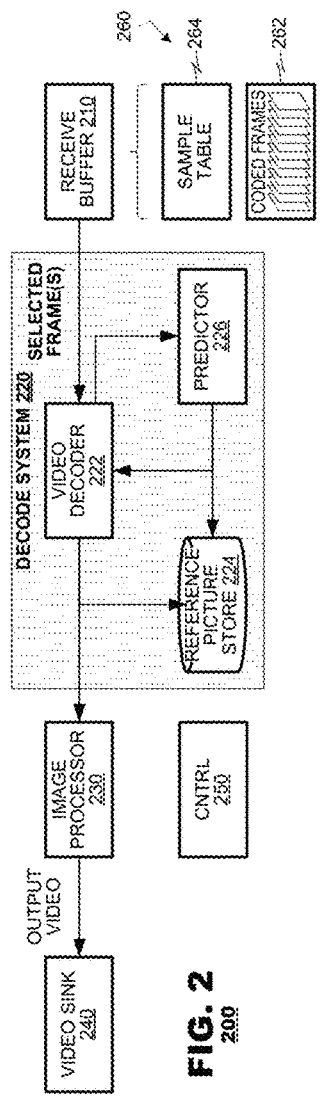
FIG. 2 is a functional block diagram of a player terminal according to an embodiment of the present disclosure.

FIG. 2 is a functional block diagram of a decoding terminal 200 (called a "player," for convenience) according to an embodiment of the present disclosure. The player 200 may include a receive buffer 210, a decoding system 220, an image processor 230, a video sink 240, and a controller 250. The receive buffer 210 may store media items 260 at the player 200 before they are decoded. The decoding system 220 may decode select frames form the media item, generating recovered frames therefrom. The image processor 230 may condition the recovered frames for rendering by the video sink 240. The video sink 240 may render the recovered frames, often by displaying them on a display device.

FIG. 2 illustrates structure of a media item 260 that may be processed by the player 200. The media item 260 may be composed of a number of coded video frames 262, which have been processed by a predetermined coding protocol, for example, ITU-T H.265 (also known as "HEVC"), H.264 ("AVC"), or some other protocol. The media item 260 may contain a number of coded frames 262 that exceed the number required for many playback applications. For example, in some instances, a media item 260 may have a number of coded frames 262 sufficient to support 240 fps playback, which might exceed a default playback rate of the video sink 240 if operating at 60 fps. The player 200, however, may engage alternate playback modes that require use of a larger number, perhaps even all frames, of the media item 260.

The media item 260 may contain metadata elements 264, called a "sample table," that describe a presentation time of each frame in the media item 260. The sample table 264 also may contain data that describes, for each frame, whether the coded frame relies on another frame from the media item 260 as a prediction reference and whether the coded frame serves as a prediction reference for another frame of the media item 260. Typically, the prediction data in a sample table indicates dependency state of each frame but it does not identify relationships among the frames. For example, the sample table 264 may indicate that a given frame is dependent on another frame as a prediction reference but it would not identify which frame within the media item is the prediction reference. Similarly, the sample table 264 may indicate that a given frame is a reference frame for another frame of the media item 260 but it would not identify which frame. A player 200 would have to review data of the coded frames 262 themselves to identify specific prediction references among frames.

Moreover, for HEVC coded video, the sample table 264 may identify a temporal level to which the frame belongs. The sample table 264 also may identify frames allowing up-switching from a temporal level to a higher temporal level.

It is not required that coded frames 262 of a media item 260 be aligned to a common presentation cadence, such as the 240 fps rate described in the foregoing example. Instead, as may be convenient for authors of media items, the timing of individual frames within the media item 260 may be provided at irregular timing intervals. Temporal locations of each frame may be identified by a presentation time stamp contained within the sample table 264.

During operation, a terminal may be controlled to operate across a variety of playback modes, which alter relationships among a timeline of a video sink device and a timeline of frames from the media item. For example, players may operate in a normal playback mode, called "1×," for convenience. Players may be controlled to operate in other modes such as fast forward, fast reverse, slow-motion forward, slow-motions reverse and even discontinuous playback (for example, looped within a finite segment of the media item timeline). In such events, a player 200 estimates which frame to play in each display interval of a video sink, called a "refresh group."

Figure 3:
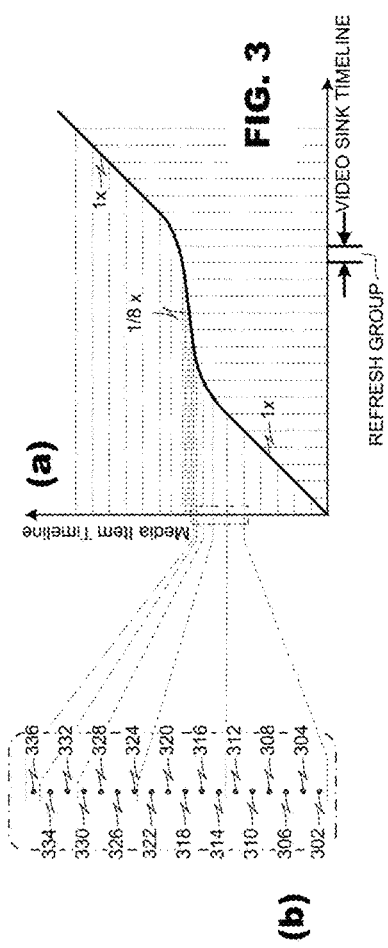
FIG. 3 is a graph illustrating exemplary relationships between coded frames from a media item and displayed frames at a video sink.

FIG. 3 is a graph illustrating relationships between coded frames from a media item and displayed frames at a video sink in an exemplary use case. As illustrated, the playback rate of a media item may vary over time as operator controls cause a media player to play the media item in different modes. FIG. 3(a) illustrates an example in which a media player operates at a normal playback rate (shown as 1×), then enters a slow-motion playback mode at a ⅛× rate for a time, before returning to a 1× playback rate. During operation, a player needs not transition instantaneously between the selected playback modes. Instead, playback rates may transition between one playback rate (say, 1×) to another playback rate (⅛×) through a plurality of interstitial playback rates (shown by the gradual transition between rates). The sequencing and timing of playback rates may be specified before playback begins in an algebraic form, or in a table. Edit Decision Lists, or "edit lists", which are provided for many common media file formats, can serve as such a table.

FIG. 3 illustrates a video sink timeline having been partitioned into a plurality of refresh groups. Each refresh group represents a unit of time in which content of a video sink is refreshed. Changes in playback rate may cause changes to the number of frames within a media item timeline that fall within each refresh group. A player 200 may select one of the frames that fall within each refresh group for decode and display. Embodiments of the present disclosure provide various techniques for selecting such frames.

FIG. 3(b) illustrates an expanded view of a segment of the graph of FIG. 3(a). FIG. 3(b) illustrates temporal locations of a number of frames 302-336 from the media item 260 (FIG. 2) distributed along the media item timeline. As illustrated, different numbers of frames 302-336 may be located in different refresh groups of the video sink based on the playback rates at work along the video sink timeline. Thus, in the example of FIG. 3, six frames 302-312 belong to a first refresh group shown in the expanded view, five frames 314-322 belong to a second refresh group, four frames 324-330 belong to a third refresh group, two frames 332-334 belong to a fourth refresh group and a single frame 336 belongs to the last refresh group shown. It is possible, in certain circumstances that a given refresh group may have no frames from a media time line associated with it; in such a case, a player may repeat a displayed frame from a previous refresh group.

FIG. 4 illustrates an exemplary frame sequence 400 composed of frames 410-465 arranged in decode order. FIG. 5 illustrates an exemplary sample table 500 corresponding to the frame sequence 400 of FIG. 4. The sample table 500 may provide information on each frame in the sequence 400 that includes the frame's presentation time (PTS) 510, and flags 520, 530 indicating whether the respective frame is dependent on another frame of the sequence and whether another frame is dependent on it. Sample tables typically do not identify the specific frames on which other frames depend but instead, merely identifies each frame's state either as having other frames dependent on it 520 or depending from another frame 530. For HEVC data, the sample table 500 also may identify a temporal level 540 to which each frame is assigned, and flags 550, 560 indicating respectively whether a frame is a temporal sub-layer access (TSA) frame and whether a frame is a stepwise temporal sublayer access (STSA) frame. The sample table 500 also may identify whether a frame is a synchronization frame and its type (for example, frame 10 is illustrated as an instantaneous decoder refresh (IDR) frame).

In an embodiment, a player 200 may estimate prediction references from data contained in the sample table without having to examine coded video data directly. FIG. 6 illustrates prediction reference inferences that may be made from the sample table 500 of FIG. 5. In this embodiment, when a frame is identified as depending on another frame—flag 530 is enabled—a player 200 may infer that the frame is dependent on the closest frame that precedes the frame in decode order and is identified as having frames dependent on it. Thus, frame 415 may be identified as depending upon frame 410 because frame 415 is identified as depending on another frame and frame 410 is the closest frame that precedes it in decode order that is identified as having other frames dependent on it (flag 520 of frame 410 is enabled). Similarly, frames 420 and 425 may be identified as depending on frame 415 because frames 420 and 425 both are identified as depending on another frame (flags 530 are enabled for frames 420 and 425) and because frame 415 is the closest frame to frames 420 and 425 that is identified as having frames dependent on it (flag 520 of frame 415 is enabled). Frame 425, in this example, is not identified as dependent on frame 420 because flag 520 is not enabled for frame 420—no other frames depend on frame 420.

In an embodiment where the sample table provides information regarding temporal levels of frames, prediction references may be confined to the frames within a common temporal level or a temporal level below it. For example, the frames 430, 445 and 460 are contained in temporal levels 1 and 2 and, therefore, would not be identified as depending on frames 420-425, 435-440 or 450-455 in temporal level 3 even if those frames were identified as having other frames depend from them.

FIG. 6 illustrates prediction references that may be derived for the frames 410-465 of FIG. 4 working from the sample table 500 of FIG. 5. FIG. 6 also illustrates temporal level assignments that may be derived from the sample table 500.

In an embodiment, a player 200 (FIG. 2) may derive prediction references among frames from information contained in a sample table 264. The player 200 also may organize frames into "refresh groups" 670, 675, frames whose presentation times fall within different display intervals of a video sink at the player 200. The player 200 may select a frame from each refresh group 670, 675 based on an analysis of the derived prediction references.

In one embodiment, a player 200 may select a predetermined number of frames from a refresh group by estimating the decoding cost of each frame, then selecting frames that minimize overall decoding cost. In the example of FIG. 6, frame 610 is an intra-coded frame and has the least decoding cost of any frame in refresh group 670. Frame 615 depends from frame 610 and frames 620, 625, and 630 both depend from frames 610 and 615. Frame 635 depends on three frames. Accordingly, frame 610 might be selected as a frame from refresh group 670 that has the lowest decoding cost.

In refresh group 675, frame 645 has the lowest decoding cost because it depends on a single frame, frame 610. Frames 650-660 each depend from two frames (frames 610 and 645), and frames 640 and 665 depend on three frames. Thus, frame 645 might be selected from refresh group 675 based on decoding cost.

In another embodiment, a player 200 may select a frame from each refresh group 670, 675 based on temporal location of the frames. For example, a select algorithm might be biased to select frames whose presentation times coincide with the temporal ends of the refresh groups 670, 675 notwithstanding perhaps a higher decoding cost that might be incurred for such frames. A selection algorithm that was driven solely by presentation time might cause frames 635 and 665 to be selected for decode and display. In such a case, due to prediction dependencies, frames 610, 615 and 630 would have to be selected for decode in order to decode frame 635. Similarly, frames 645 and 660 (and frame 610) would have to be decoded in order to decode frame 665.

Frame selection algorithms also may balance of temporal distance and decoding cost considerations. For example, rather than displaying frames 635 and 665, a selection algorithm may assign weights to each frame representing estimated decoding cost and alignment of presentation with desired temporal locations within refresh groups 670, 675. In such an embodiment, frames 630 and 660 might be selected for display. These frames have lower decoding costs than the frames 635 and 665 respectively but may have presentation times that coincide generally with the temporal ends of the refresh groups 670, 675.

Embodiments of the present disclosure are expected to provide a selection protocol that identifies frames for decode with reasonable processing cost. Because frame dependency estimates are created from review of a sample table 264 (FIG. 2), the frame selection algorithm may operate at lower processing cost than other selection techniques that review frame dependency information provided in coded frames themselves.

FIG. 7 illustrates a method 700 for selecting frames for decode according to another embodiment of the present disclosure. The method 700 may operate on frames from a media item that organized according to "refresh groups," frames whose presentation times fall within a given display interval of a video sink device (FIG. 3). The method 700 may estimate prediction dependencies among fames based on data provided in a sample table (box 705). For example, the method 700 may determine, for each frame, whether the frame depends on another frame in the refresh group as a prediction reference (box 710). If not, then the method 700 may mark the frame as a "root" (box 715). If so, the method 700 may mark the frame as a "non-root" (box 720). The method 700 also may determine whether the frame serves as a prediction reference for a frame in another refresh group (box 725). If not, the method 700 may mark the frame as a "leaf" (box 730). If so, the method 700 may mark the frame as a "non-leaf" (box 735). Thus, each frame in the refresh group may be marked as either root or non-root and also as either leaf or non-leaf. Thereafter, the method 700 may determine whether to select a frame for decode based on analyses of these markings.

The method 700 may determine how many frames within the refresh group are marked as roots (box 740). If there is only one, the root frame may be selected for decoding (box 745).

The method 700 may discard from selection the frames marked both as leaf frames and as non-root frames (box 750).

The method 700 may determine if a root frame has been selected (box 755). If a frame has been selected, then the method 700 may drop from selection all frames in the refresh group that are marked as both root and leaf (box 760).

The method 700 may determine if all parent frames of the root frames in a refresh group have already been selected (box 765). If so, the method 700 may drop all frames that are marked as both root and leaf that precede the root frame(s) in presentation order (box 770). The method 700 also may drop all root and leaf frames that follow the root frame(s) in presentation order that are "only children," their parent frame has no other frames that depend on it as a prediction reference (box 775).

The method 700 may select for decode all frames in the refresh group that are common parent(s) to the frames that remain eligible for selection (box 780). Also, the method 700 may select for decode all parent frames of the selected frames (box 785).

Operation of the method 700 may repeat over several iterations until a frame is selected from a refresh group. In some circumstances, the method 700 may not cause a frame to be selected based solely on analysis of the frames within the refresh group itself. In such cases, the method 700 may evaluate frames of later refresh groups until either a frame is selected or until a threshold number of frames is considered and the method 700 has not converged on selection of a frame. When a threshold number of refresh groups have been evaluated and the method 700 has not converged on selection of a frame, the method may select for decode all frames from the refresh group that have not yet been dropped.

Figure 8:
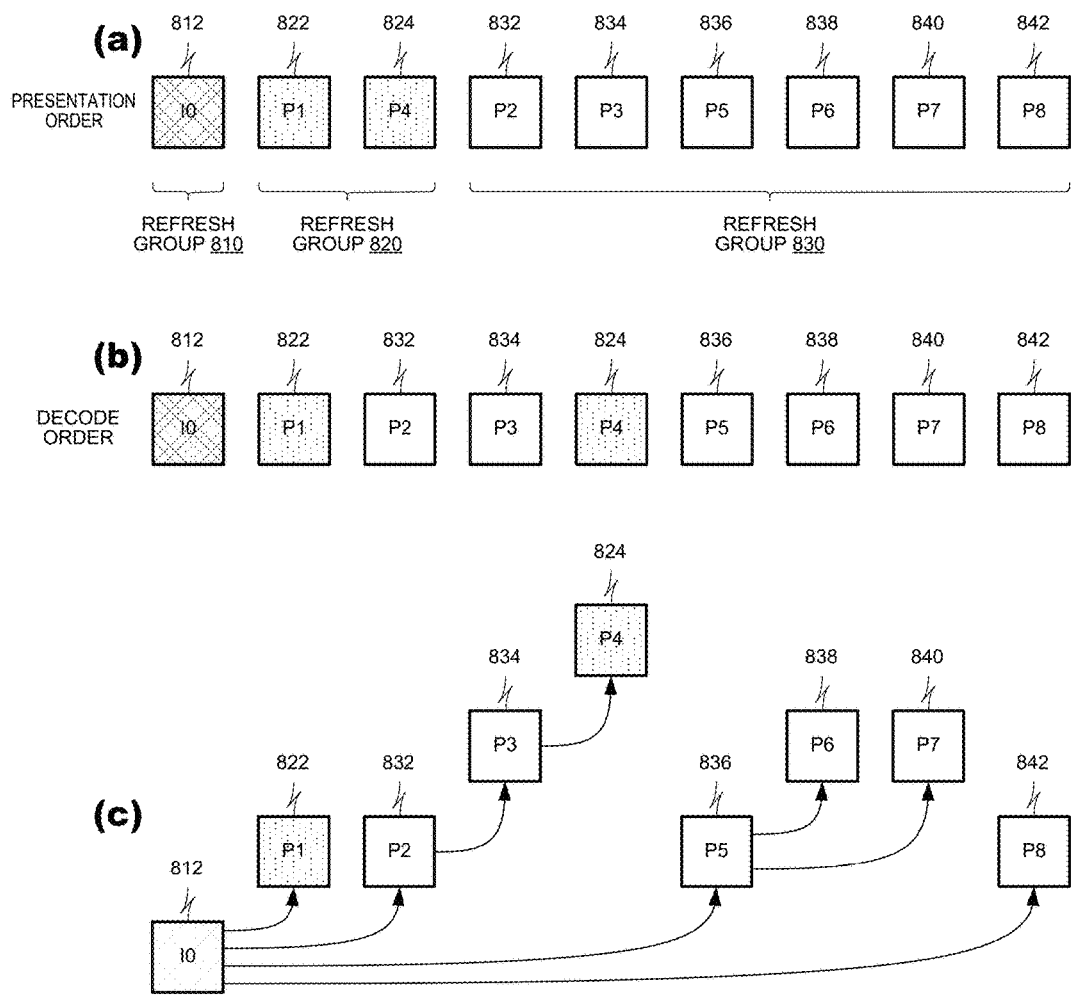
FIG. 8 illustrates an exemplary video sequence on which the method of FIG. 7 may operate.

FIG. 8 illustrates an exemplary video sequence 800 on which the method 700 of FIG. 7 may operate. There, the video sequence is shown having been partitioned into three refresh groups 810, 820, 830. The first refresh group 810 has a single frame. The second refresh group 820 has two frames 822, 824. The third refresh group 830 has six frames 832-842. FIG. 8(a) illustrates the frames arranged according to their presentation times. FIG. 8(b) illustrates the frames in an order in which they may be presented for decode. FIG. 8(c) illustrates dependencies among the frames 812, 822-824, 832-842 that may be derived from information provided in a sample table.

Table 1 illustrates status of each frame illustrated in FIG. 8 based on estimated prediction references illustrated in FIG. 8(c):

TABLE 1

| Frame | Root/Non-Root | Leaf/Non-Leaf |
| --- | --- | --- |
| Frame I0 812 | Root | Non-Leaf |
| Frame P1 822 | Root | Leaf |
| Frame P2 832 | Root | Non-Leaf |
| Frame P3 834 | Non-Root | Non-Leaf |
| Frame P4 824 | Root | Leaf |
| Frame P5 836 | Root | Leaf |
| Frame P6 838 | Non-Root | Leaf |
| Frame P7 840 | Non-Root | Leaf |
| Frame P8 842 | Root | Leaf |

When the method 700 operates on refresh group 810, frame 812 is identified as the only root in the refresh group and, therefore, it will be selected during operation of box 745.

When the method 700 operates on refresh group 820, frames 822 and 824 both may be identified as root and leaf frames. Operation of the method 700 may advance to box 775, because the parent(s) of root frame 822 (here, frame 812) have been selected. At box 775, frames that appear later in than the root frame in presentation order that identified as root and leaf frames are only children may be discarded from selection. In the case of refresh group 820, the frame 824 is marked as both root and leaf and appears later in presentation order than frame 822 and is an only child of frame 834 (frame 834 has no other children); frame 824 may be discarded from selection. Thus, frame 822 may be selected from refresh group 820 for decoding in box 745 in another iteration of the method 700.

When frames from a refresh group are selected for decoding and other frames are discarded from selection, such operations may affect state of other frames. For example, in the sequence illustrated in FIG. 8, frame 824 is a root frame that depends from frames 832 and 834 in another refresh group 834. Frames 832 and 834, therefore, initially may be identified as non-leaf frames. When frame 824 is discarded during processing of the refresh group 820, it may change the states of frames 832 and 834 each to a leaf.

When the method 700 operates on refresh group 830, frames 832, 836 and 842 may be identified as root frames and, therefore, the method 700 may proceed from box 740 to box 750. There, the method 700 may discard frames 834 (if changed to a leaf during processing of refresh group 820), 838 and 840 from selection as they are marked as non-root and leaf. The method 700 may advance to box 755 and determine if a root frame has been selected. At this point, none of the three root frames 832, 836 or 842 have been selected for decoding. The method 700 may advance to box 765 and determine that the parent frame(s) of all three root frames 832, 836 and 842 (frame 812) have been selected for decode. For each root frame, the method 700 may discard all earlier frames in presentation order that are marked as root and leaf. In the case of frame 842, this may cause frame 836 to be discarded. Frame 832 (if not yet changed to a leaf during processing of refresh group 820) and frame 842 may remain eligible for selection.

Operation of the method 700 may repeat as necessary until a frame is selected for decode. States of the frames may be refreshed based on the frames that remain eligible for selection. For example, at the end of a first iteration that operates on refresh group 830, frames 832 and 842 may remain eligible for selection. Once frame 824 is discarded from selection, the state of frame 832 may be changed—where initially frame 832 was marked root and non-leaf because frame 824 depended from it, frame 832 may be marked as root and leaf because frame 824 is no longer eligible to be selected for decoding. On a next iteration, when box 770 is applied to frame 842, frame 832 may be discarded from selection as a frame that is marked as both root and leaf and frame 832 precedes frame 842 in presentation order. On a third iteration, frame 842 may be selected for decode because it is the only root frame in the refresh group that remains eligible for selection.

The method 700 of FIG. 7 provides another frame selection technique that balances coding cost and temporal spacing among frames. By prioritizing root frames for selection, those that do not depend on other frames from the refresh group for prediction, the method 700 provides a bias in favor of frames that have low decode cost. Moreover, by prioritizing frames toward the end of a refresh group in presentation order, the method 700 provides a bias in favor of temporal spacing.

In an embodiment, the selection of frames for decode may be made from a timeline of the sequence of playback rates that is determined in advance of playback time. As such, the proposed algorithm(s) may assign future frames to refresh groups and may identify, from prediction dependencies, the frame(s) that will need to be decoded to permit decode of selected frames in those future refresh groups, notwithstanding perhaps extreme changes to playback rates. While many coding protocols (HEVC, in particular) permit decoders to switch between temporal levels at certain identified points in a frame sequence, performing switch ups based solely on TSA- and/or STSA-frames can lead to coding inefficiencies. It is unlikely that TSA- and STSA-markings will align to the frames that a player needs to begin increasing effective frame rates. As a result, a player may run into a circumstance where changes to a playback rate cause the player to increase the number of frames that will be selected for decode but those frames' parents (the frames on which the select frames depend for prediction) were not available because they were not selected for decode prior to the change in playback rate. The proposed techniques perform a look-ahead along a player timeline that effectively causes temporal-level switch-ups to be performed where necessary to deliver additional frames for decode that will be required at a later point in the timeline. Thus, the proposed techniques may cause an increase in the rate of decode at some time earlier than the playback rate increases.

Figure 9:
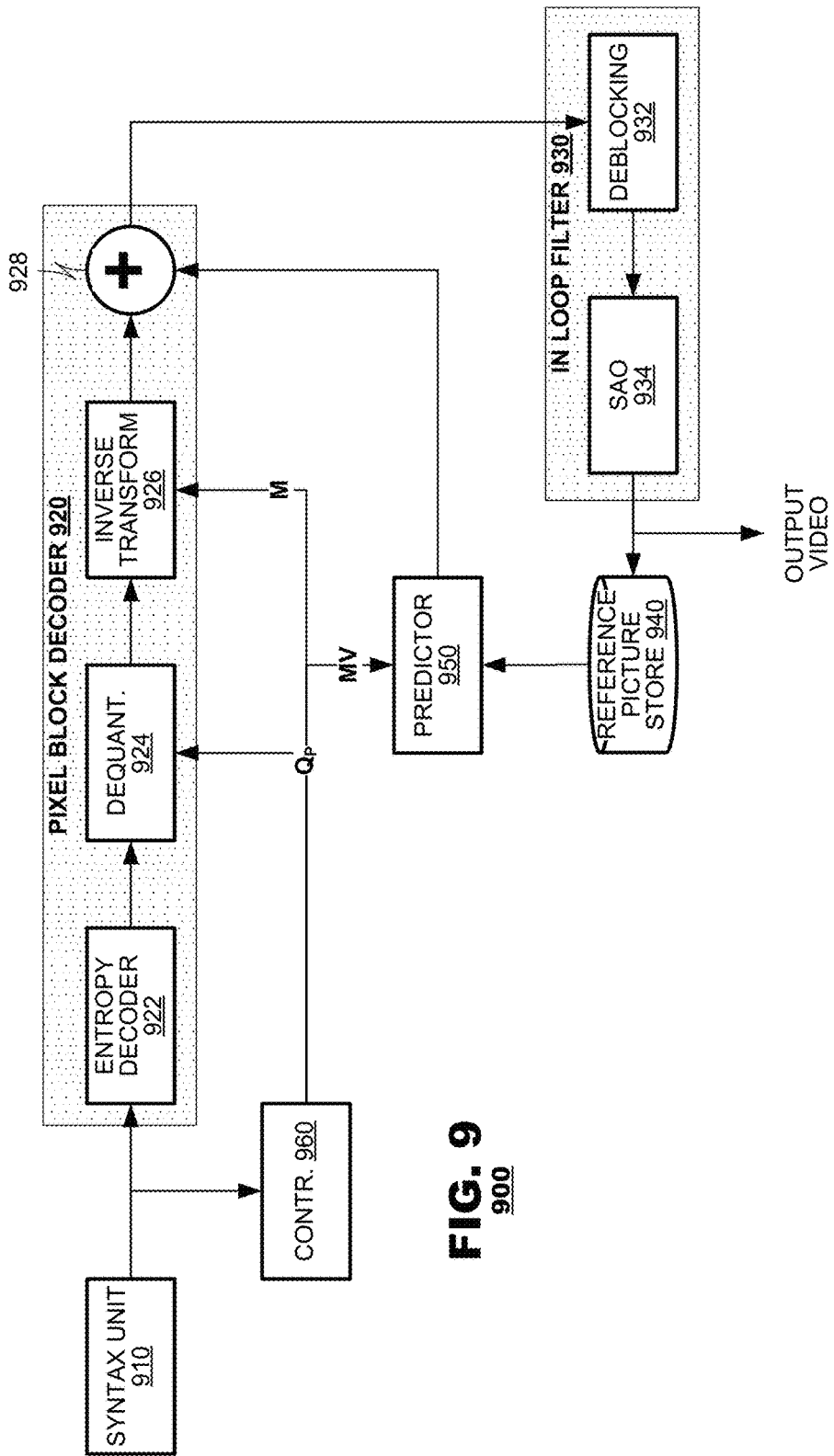
FIG. 9 is a functional block diagram of a decoding system according to an embodiment of the present disclosure.

FIG. 9 is a functional block diagram of a decoding system 900 according to an embodiment of the present disclosure. The decoding system 900 may include a syntax unit 910, a pixel block decoder 920, an in-loop filter 930, a reference picture store 940, a predictor 950, and a controller 960. The syntax unit 910 may receive data of select coded frames and may parse the coded data into its constituent parts. Data representing coding parameters such as prediction mode, quantization parameters, etc. may be furnished to the controller 960 while data representing coded residual data may be furnished to the pixel block decoder 920.

The pixel block decoder 920 may perform decoding operations mandated by a governing coding protocol. The in-loop filter 930 may filter frame data formed by reconstructed pixel blocks. The reconstructed frame data may be output from the decoding system 900 as output video. Decoded frames that are designated as "reference frames" by the coded video data may be stored in the prediction buffer 940 for use in prediction operations. The predictor 950 may supply prediction data to the pixel block decoder 920 as determined by coding data received in the coded video data stream.

The pixel block decoder 920 may include an entropy decoder 922, a dequantizer 924, an inverse transform unit 926, and an adder 928. The entropy decoder 922 may perform entropy decoding to recover quantized transform coefficients from entropy coded data. The dequantizer 924 may scale the quantized transform coefficients by a quantization parameter QP that is derived from the coded video data. The inverse transform unit 926 may perform a transform operation on scaled coefficients output by the dequantizer 924, to generate pixel residual signals therefrom. The inverse transform unit 926 may operate according to a transform mode M that is derived from coded frame data. The adder 928 may combine pixel residual signals output by the inverse transform unit 926 with prediction data provided to the pixel block decoder 920 by the predictor 950. The adder 928 may output recovered pixel block data to the in loop filter 930.

Coded frame data may include metadata identifying coding operations that were applied by a video coder (not shown) that generated the coded data. As indicated, the metadata may include identifiers of quantization parameters QP and transform modes M that were applied during coding. The metadata also may identify a coding mode that was applied and a prediction reference that was selected as part of the coding mode. Many video coders perform both intra- and inter-coding. Intra-coding typically exploits spatial redundancies by coding a pixel block with reference to another pixel block from a common frame; thus, the intra-coding mode may be identified along with an identification of a pixel block from the frame that provides a prediction reference. Inter-coding typically exploits temporal redundancies in video by coding a pixel block with reference to one or a pair of previously-coded reference frames; the inter-coding mode may be identified along with identifications of pixel block(s) from the reference frame(s). Representations of coding modes and the prediction references are defined by the coding protocol under which the decoder 900 operates.

In an embodiment, the predictor 950 may retrieve previously-decoded data from the reference store 940 as referenced by the coding mode data and the prediction identifiers. The predictor 950 may retrieve a pixel block that is referenced by the prediction data and furnish it to the adder 928 in the pixel block decoder 920. The adder 928 may perform a pixel-wise addition between the prediction pixel block provided by the predictor 950 and the prediction residuals generated by the inverse transform unit 926 to generate a decoded pixel block.

The in-loop filter 930 may perform various filtering operations on reconstructed pixel block data. As illustrated, the in-loop filter 930 may include a deblocking filter 932 and a sample adaptive offset ("SAO") filter 934. The deblocking filter 932 may filter data at seams between reconstructed pixel blocks to reduce discontinuities between the pixel blocks that arise due to coding. SAO filters 934 may add offset to pixel values according to an SAO type, for example, based on edge direction/shape and/or pixel level. Other types of in-loop filters may also be used in a similar manner.

The reference picture store 940 may store decoded frames output by from the in loop filter for use in later prediction of other pixel blocks. The reference picture store 940 may store decoded pixel block data of each picture as it is coded for use in intra prediction. The reference picture store 940 also may store decoded reference pictures.

The controller 960 may control overall operation of the decoding system 900. The controller 960 may set operational parameters for the pixel block decoder 920 and the predictor 950 based on parameters received in the coded video data stream.

The techniques described herein may be performed by a computer system that performs decoding. FIG. 10 illustrates an exemplary computer system 1000 that is suitable for use with the foregoing techniques. The computer system 1000 may include a central processor 1010, a memory 1020, and a transceiver 1030 provided in communication with one another. Optionally, the device also may include a decoder 1040, sink components such as a display 1050, and operator controls 1060.

The central processor 1010 may read and execute various program instructions stored in the memory 1020 that define an operating system 1012 of the system 1000 and various applications 1014.1-1014.N. As it executes those program instructions, the central processor 1010 may read, from the memory 1020, coded video data and select coded frames for decode. Frames that are selected may be furnished to a decoder 1040 for decode. In one embodiment, the decoder 1040 may be provided as a discrete hardware processor that is separate from the central processor 1010. In another embodiment, the decoder 1014.2 may be provided as an application program that is stored in memory 1020 and executed by the central processor 1010. The principles of the present disclosure find application with either embodiment.

In some embodiments, a system 1000 need not include a decoder 1040 of its own. For example, a system 1000 may review a media item to select frames that will be transmitted to another device (not shown) for decode. Such embodiments may find application in systems that "share" media items by selecting frames that will be played by another device, extracting them from a media item and transmitting a file that contains the extracted frames to the other device.

As indicated, the memory 1020 may store program instructions that, when executed, cause the processor to perform the techniques described hereinabove. The memory 1020 may store the program instructions on electrical-, magnetic- and/or optically-based storage media.

The transceiver 1030 may represent a communication system to transmit transmission units and receive acknowledgement messages from a network (not shown). In an embodiment where the central processor 1010 operates a software-based video coder, the transceiver 1030 may place data representing state of acknowledgment message in memory 1020 to retrieval by the processor 1010. In an embodiment where the system 1000 has a dedicated decoder, the transceiver 1030 may exchange state information with the decoder 1040.

The display 1050 and operator controls 1060 may be provided in a form that is appropriate for the application for which the system 1000 will be used. For example, where the system 1000 is integrated into a portable media player, such as in a smartphone or tablet computer, the video sink may be a liquid crystal display (LCD)-based or light emitting diode (LED)-based display and the operator controls may be provided as virtual icons on the display for use with a touch screen input system. In other embodiment, where the player may be integrated in a wide audience entertainment system, the display 1050 may be a flat panel or projection based system and the operator controls 1060 may be provided as a remote control or button array. The principles of the present disclosure find application in all such system.

Several embodiments of the present disclosure are specifically illustrated and described herein. However, it will be appreciated that modifications and variations of the present disclosure are covered by the above teachings and within the purview of the appended claims without departing from the spirit and intended scope of the disclosure.

The invention claimed is:

1. A method comprising:
   estimating, from a media item, coding prediction dependencies among frames of the media item;
   based on a playback rate of a media player, identifying a collection of the frames from the media item that have presentation times within a display refresh time of the media player; and
   selecting a frame of the collection for decode and display during the display refresh time based on the estimated prediction dependencies.

2. The method of claim 1, wherein the estimation is based on a sample table for the media item identifying dependency state among frames in the media item.

3. The method of claim 2, wherein the sample table includes, for each frame:
   data identifying the presentation time of the respective frame;
   a flag identifying whether the respective frame relies on another frame in the media item as a prediction reference;
   a flag identifying whether the respective frame is a prediction reference for another frame in the media item.

4. The method of claim 1, wherein the selection of a frame is based on an estimate of relative decoding costs among frames in the collection.

5. The method of claim 1, wherein the selection of a frame is based on an estimate of presentation times among frames in the collection.

6. The method of claim 1, wherein the selection comprises:
   classifying each frame in the collection based on whether it depends from another frame in the collection; and
   if there is only one frame in the collection that does not depend from another frame in the collection, selecting the frame for decode.

7. The method of claim 1, wherein the selection comprises:
   classifying each frame in the collection based on whether other frame(s) from the media item depend from it; and
   discarding from selection frames that do not have other frame(s) from the media item depend from them.

8. The method of claim 1, wherein the selection comprises:
   classifying each frame in the collection based on whether frame(s) from other collection(s) depend from it; and
   discarding from selection frames that do not have other frame(s) from other collection(s) depend from them.

9. The method of claim 1, wherein the selection comprises, iteratively:
   classifying each frame in the collection in one of two first states based on whether it depends from another frame in the collection;
   classifying each frame in the collection in one of two second states based on whether other frame(s) from the media item depend from it; and
   selecting one frame from the collection for decoding based on an evaluation of the frames' first state and second state.

10. The method of claim 1, further comprising decoding the selected frame.

11. The method of claim 1, further comprising repeating the identifying and selecting steps over a plurality of playback rates that vary between a normal playback rate and a slow motion playback rate.

12. The method of claim 1, further comprising repeating the identifying and selecting steps over a plurality of playback rates that vary.

13. A non-transitory computer readable medium storing program instructions thereon that, when executed by a processing device, cause the device to:
   estimate, from a media item, coding prediction dependencies among frames of the media item;
   based on a playback rate of a media player, identify a collection of the frames from the media item that have presentation times within a display refresh time of the media player;
   select a frame of the collection for decode and display during the display refresh time based on the estimated prediction dependencies.

14. The medium of claim 13, wherein the estimation is based on a sample table for the media item identifying dependency state among frames in the media item.

15. The medium of claim 14, wherein the sample table includes, for each frame:
   data identifying the presentation time of the respective frame;
   a flag identifying whether the respective frame relies on another frame in the media item as a prediction reference;
   a flag identifying whether the respective frame is a prediction reference for another frame in the media item.

16. The medium of claim 13, wherein the selection of a frame is based on an estimate of relative decoding costs among frames in the collection.

17. The medium of claim 13, wherein the selection of a frame is based on an estimate of presentation times among frames in the collection.

18. The medium of claim 13, wherein the selection comprises:
classifying each frame in the collection based on whether it depends from another frame in the collection; and
if there is only one frame in the collection that does not depend from another frame in the collection, selecting the frame for decode.

19. The medium of claim 13, wherein the selection comprises:
classifying each frame in the collection based on whether other frame(s) from the media item depend from it; and
discarding from selection frames that do not have other frame(s) from the media item depend from them.

20. The medium of claim 13, wherein the selection comprises:
classifying each frame in the collection based on whether frame(s) from other collection(s) depend from it; and
discarding from selection frames that do not have other frame(s) from other collection(s) depend from them.

21. The medium of claim 13, wherein the selection comprises, iteratively:
classifying each frame in the collection in one of two first states based on whether it depends from another frame in the collection;
classifying each frame in the collection in one of two second states based on whether other frame(s) from the media item depend from it; and
selecting frame(s) from the collection for decoding based on an evaluation of the frames' first state and second state.

22. The medium of claim 13, wherein the program instructions cause the device to repeat the identifications and selections over a plurality of playback rates that vary between a normal playback rate and a slow motion playback rate.

23. A system, comprising:
a display;
a processor; and
a memory storing program instructions thereon that, when executed by the processor, cause the processor to:
estimate, from a media item, coding prediction dependencies among frames of the media item;
based on a playback rate of the decoder, identify a collection of the frames from the media item that have presentation times within a display refresh time of the display;
select a frame of the collection for decode and display during the display refresh time based on the estimated prediction dependencies.

24. The system of claim 23, wherein the estimation is based on a sample table for the media item identifying dependency state among frames in the media item.

25. The system of claim 24, wherein the sample table includes, for each frame:
data identifying the presentation time of the respective frame;
a flag identifying whether the respective frame relies on another frame in the media item as a prediction reference;
a flag identifying whether the respective frame is a prediction reference for another frame in the media item.

26. The system of claim 23, wherein the processor selects the frame based on an estimate of relative decoding costs among frames in the collection.

27. The system of claim 23, wherein the processor selects the frame based on an estimate of presentation times among frames in the collection.

28. The system of claim 23, wherein the processor selects the frame by:
classifying each frame in the collection based on whether it depends from another frame in the collection; and
if there is only one frame in the collection that does not depend from another frame in the collection, selecting the frame for decode.

29. The system of claim 23, wherein the processor selects the frame by:
classifying each frame in the collection based on whether frame(s) from other collection(s) depend from it; and
discarding from selection frames that do not have other frame(s) from other collection(s) depend from them.

30. The system of claim 23, wherein the processor selects the frame by, iteratively:
classifying each frame in the collection in one of two first states based on whether it depends from another frame in the collection;
classifying each frame in the collection in one of two second states based on whether frame(s) from other collection(s) depend from it; and
selecting one frame from the collection for decoding based on an evaluation of the frames' first state and second state.

31. The system of claim 23, further comprising a decoder to decode selected frame(s).

32. The system of claim 23, wherein the processor repeats the identifications and selections over a plurality of playback rates that vary.

* * * * *